(12) United States Patent
Andermo et al.

(10) Patent No.: US 6,271,661 B2
(45) Date of Patent: *Aug. 7, 2001

(54) ABSOLUTE POSITION TRANSDUCER HAVING A NON-BINARY CODE-TRACK-TYPE SCALE

(75) Inventors: Nils Ingvar Andermo, Kirkland; Karl G. Masreliez; Kurt E. Steinke, both of Bellevue, all of WA (US)

(73) Assignee: Mitutoyo Corporation, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/268,702

(22) Filed: Mar. 16, 1999

(51) Int. Cl.⁷ .............................. G01B 7/00; G01B 7/14; G01D 5/20; H03M 1/22; C08C 19/06
(52) U.S. Cl. .......................... 324/207.17; 324/207.22; 324/207.24; 336/45; 340/870.32; 341/1; 341/15
(58) Field of Search ................ 324/207.15–207.19, 324/207.22, 207.24, 207.25; 341/1, 3, 9–11, 13, 15, 16; 340/870.32, 870.33; 336/45; 235/449; 250/231.14, 231.18

(56) References Cited

U.S. PATENT DOCUMENTS

| | | |
|---|---|---|
| 3,820,110 * | 6/1974 | Henrich et al. ............ 324/207.22 X |
| 4,014,015 * | 3/1977 | Gundlach ................... 324/207.22 X |
| 4,628,298 * | 12/1986 | Hafle et al. ..................... 341/13 X |
| 4,697,144 | 9/1987 | Howbrook . |
| 4,879,508 | 11/1989 | Andermo . |
| 4,893,077 | 1/1990 | Auchterlonie . |
| 5,023,559 | 6/1991 | Andermo . |
| 5,027,526 | 7/1991 | Crane . |
| 5,841,274 | 11/1998 | Masreliez et al. .............. 324/207.17 |

* cited by examiner

Primary Examiner—Gerard R. Strecker
(74) Attorney, Agent, or Firm—Oliff & Berridge, PLC

(57) ABSTRACT

An absolute position transducer system has two members movable relative to each other and includes a code track transducer and at least one fine wavelength transducer. The code track is arranged to form a sequential pattern of base-N code words, where N is greater than two (i.e., non-binary). Each sequential non-binary code word identifies an absolute position of one member with respect to the other at a first resolution. Alternatively, the code track is arranged to form a pseudo-random non-binary code word pattern. In this case, the transducer system compares a non-binary code word with a look-up table to determine an absolute position of one member with respect to the other at a first resolution. In order to generate a non-binary code word pattern, code track transducer employs different-sized flux disrupters, different-sized flux enhancers, or a combination of flux disrupters and enhancers.

27 Claims, 10 Drawing Sheets

| Logic level | Signal |
|---|---|
| 4 | Max positive |
| 3 | Half positive |
| 2 | Zero |
| 1 | Half Negative |
| 0 | Max negative |

Fig. 3

| Logic level | Signal |
|---|---|
| 2 | Max positive |
| 1 | Zero |
| 0 | Max negative |

Fig. 5

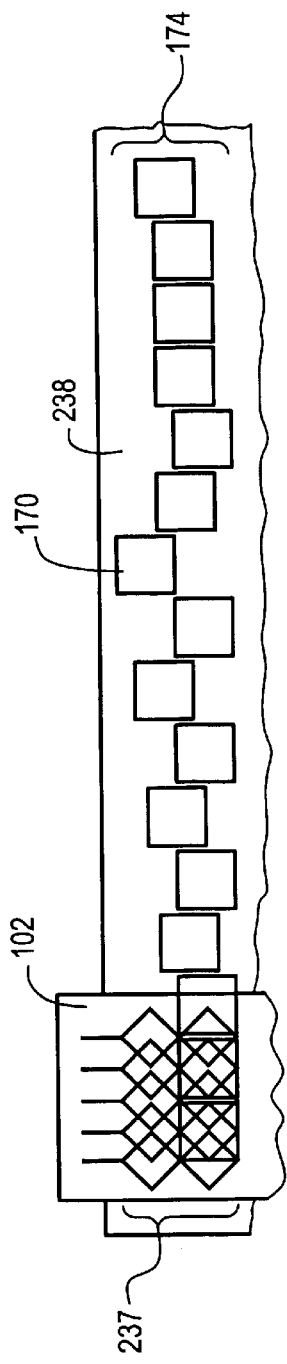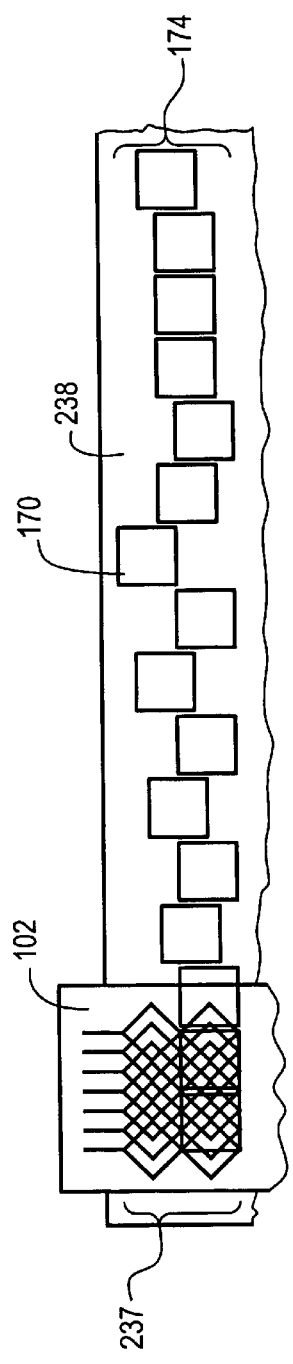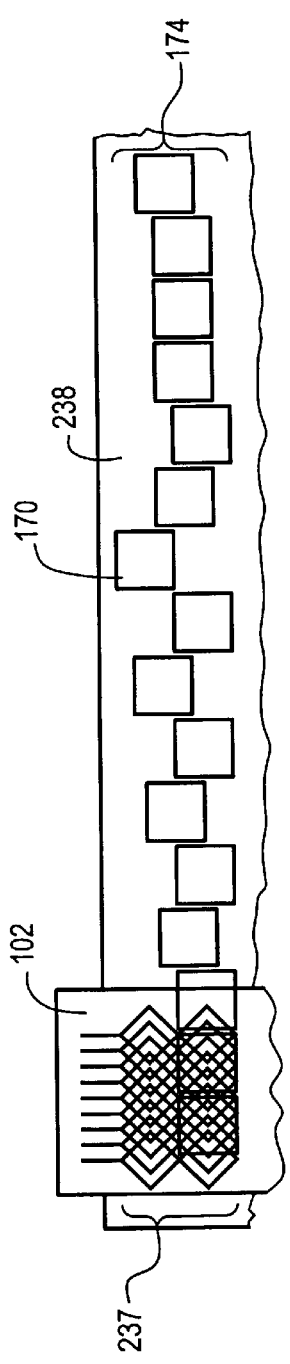

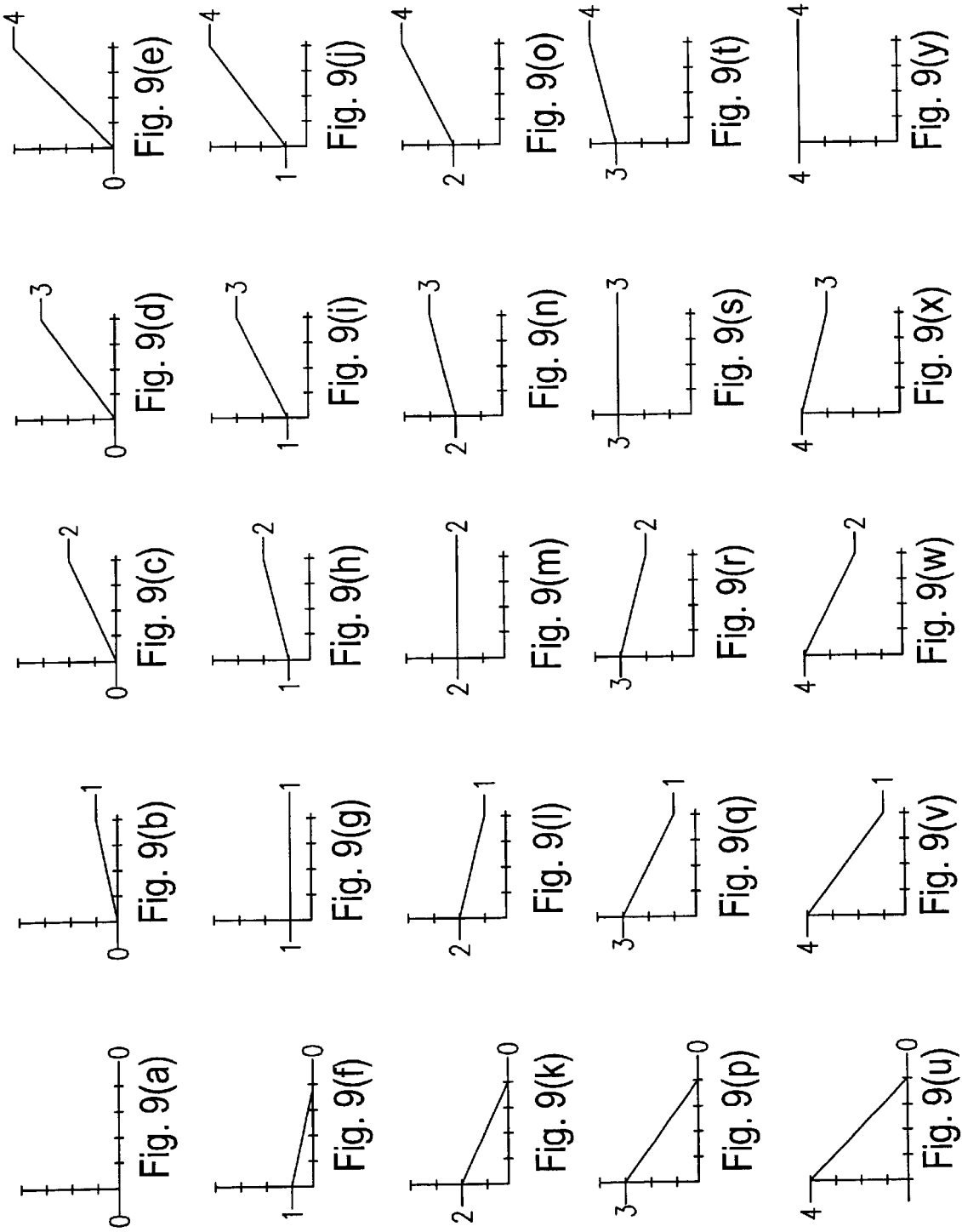

| TWO-DIGIT CODE | Xcode |
| --- | --- |
| 00 | 1 |
| 01 | 2 |
| 10 | 3 |
| 02 | 4 |
| 21 | 5 |
| 11 | 6 |
| 12 | 7 |
| 22 | 8 |
| 20 | 9 |

Fig. 13

ABSOLUTE POSITION TRANSDUCER HAVING A NON-BINARY CODE-TRACK-TYPE SCALE

BACKGROUND OF THE INVENTION

1. Field of the Invention

This invention relates to an absolute position inductive transducer. More particularly, this invention is directed to an absolute position inductive transducer that includes a non-binary code-track-type scale for extending the length of the absolute position scale.

2. Description of Related Art

U.S. Pat. No. 4,893,077 to Auchterlonie describes an absolute position sensor employing several linear tracks of inductive transducers. Each track of this sensor has a slightly different wavelength or frequency. The circuits in the sensor analyze the phase difference between the tracks to determine the absolute position of the read head. Similar known systems employ capacitive transducers having multiple tracks of capacitive elements, such as U.S. Pat. Nos. 4,879,508 and 5,023,599 to Andermo. The absolute position sensors of Auchterlonie and Andermo, however, suffer from a number of problems, including scale length limitations, sensitivity to contamination, increased manufacturing costs due to tight tolerance requirements, and difficulty to incorporate into hand-held devices.

U.S. Pat. No. 4,697,144 to Howbrook discloses a transducer that employs several pitches of coils (each pitch representing 360° of phase change) to similarly provide an absolute position using an inactive member. This transducer, however, has a limited range within which to determine the absolute position of the inactive member. Additionally, this transducer fails to provide sufficient accuracy for most applications.

U.S. Pat. No. 5,027,526 to Crane describes an optical transducer that reads a bar code pattern printed on a coiled tape. This bar code pattern is the standard interleaved 2 of 5 bar code symbol that encodes several numbers between start and stop bar code patterns. The numbers, in turn, correspond to a coarse absolute position of the tape. Circuits read the bar code symbols and convert them to numbers representing the absolute position of the tape. Clockings based on the position of a drum that coils the tape determine a fine position measurement.

This absolute transducer, however, suffers from traditional problems of optical transducers, such as scale length limitations, sensitivity to contamination, increased manufacturing costs, and large current supply requirements. Furthermore, this absolute transducer is not a true absolute transducer at every position, because the transducer requires a scanning motion through a range as long as the bar code in order to derive or update an absolute position measurement. This renders it unusable for many applications.

U.S. patent application Ser. No. 08/788,469, filed Jan. 29, 1997, U.S. Pat. No. 5,886,519 and U.S. Pat. No. 5,841,274 to Masreliez et al., each herein incorporated by reference in its entirety, disclose a number of longer-range absolute position transducers. One current absolute position transducer increases the absolute position range by using multiple analog tracks with different repeat lengths. However, the current state of the art for inductive and capacitive transducers imposes a maximum practical ratio of wavelengths between tracks of about 32:1 (regardless of whether the ratio is established by the primary wavelengths, or by a beat frequency between closely spaced wavelengths), a minimum for the fine wavelengths from 1.28 mm to 5.12 mm, and read head lengths of at least five fine wavelengths for most metrology applications. Longer fine wavelengths provide proportionately lower resolution and accuracy. Therefore, the maximum length of a two-track scale would be 32 fine wavelengths (about 40 to 160 mm). Longer scales would require more tracks, more read heads, and wider overall scale width, thus are more expensive and require a larger physical size. A typical scale with a fine wavelength of 2.56 mm would require 3 tracks and read heads to achieve a scale length of between 80 mm and 2500 mm.

Another current absolute position transducer disclosed in Masreliez uses binary coded tracks to increase the absolute position range. This transducer requires a code track having N-bit code words and N read heads to achieve a coarse scale length of $2^N$ fine wavelengths. A scale would require 8 read heads to achieve a coarse scale length of 256 fine wavelengths. This transducer uses a pseudo-random sequence of code words analyzed along the code track. Shifting the read head by one code position anywhere in the sequence will generate a unique code word, distinguishable from all other code words. Each code word position corresponds to and uniquely identifies a particular fine wavelength of a fine wavelength scale having approximately $2^N$ fine wavelengths. Once the particular fine wavelength is identified, the fine wavelength scale can be used to identify the absolute position to a fine resolution. However, the length of this transducer is limited to the length of the coarse wavelength. Further, not all code words are usable because of the inability to unambiguously determine certain code words.

Another current transducer uses separator marks such as start, stop, and parity bits between code words. Therefore, in a binary system which can read an 8-bit code word and uses three bits to accomplish synchronization, the maximum scale length would be $8*2^{(8-3)}(256)$ bit positions.

U.S. patent application Ser. No. 09/143,790 to Steinke, filed Aug. 31, 1998, U.S. Pat. No. 6,157,188 herein incorporated by reference in its entirety, discloses a number of compact, long-range absolute position transducers. These transducers include an encoded numerical binary code track and at least one analog fine scale track so that a coarse wavelength can be determined. The code track is arranged so that each coarse wavelength has a predetermined relationship with one sequentially arranged code word or with a block of code words. Because the starting point of the code words can be determined, no codes need to be avoided to prevent ambiguity.

Yet another current transducer uses continuously varying wavelengths. This technique will work with a single track. However, the fine scale accuracy degrades as the wavelength increases toward the ends of the scale, since there are fewer fine scale marks under the read head. Additionally, the reduced spacing between the marks decreases the contrast between the phases. In this device, the scale length is limited by the read head length, the minimum spacing which allows marks to be accurately distinguished, and the minimum number of marks which are required under the read head for adequate accuracy.

SUMMARY OF THE INVENTION

There is thus a need for an absolute position transducer system that is suitable for a wide variety of applications, including very long measuring range applications and low-power applications, that is accurate, compact, and relatively inexpensive to manufacture compared to the conventional transducers described above, and that provides an absolute position output signal.

This invention provides an inductive absolute position transducer having a longer scale for a given read head length, or a smaller read head for a given scale length. The inductive absolute position transducer provides a longer maximum scale length than transducers using pseudo-random binary code tracks and sequential binary code tracks.

The absolute position transducer of this invention is useful for high accuracy applications such as linear or rotary encoders. This high accuracy is on the order of 0.1 micron for a one meter absolute scale.

One embodiment of the inductive absolute position transducer of this invention includes a code-track-type scale having sequentially arranged, non-binary code words. The code track uses more than two levels to create a base-N code word where N is greater than 2 (i.e., non-binary). Preferably each digit will have an even number of levels, so that with differential windings used for both digit value and phase measurement, zero output is only seen when the sensor loop is positioned over the space between code digits on the scale. The maximum scale length would be $N^M$ code words, or $M*N^M$ code digits. Thus, for example, a scale with six base-4 digits per code word would have a maximum scale length of 24576 digit positions.

If six-digit code track words increment sequentially from "$000000_4$" through all 24576 steps to "$333333_4$" from left to right, the absolute position code word is determined by finding the start position of the code word, incrementing any digits to the left of the detected start position of the code word by one, and shifting the incremented digits to the right end of the code word. If the code track decrements from left to right, the absolute position code word is determined by decrementing any digits to the left of the detected start position of the code word by one before shifting the incremented digits to the right end of the code word. Thus, the appropriate code word and the position of the read head relative to the code word can be determined independently of the absolute position of the read head relative to the scale. As a result, the maximum scale length is a multiple of the maximum code track word length and the analog coarse wavelength, instead of the code track word length and the bit length, as in the 469 application and the 274 patent. Therefore, the scale length can be further increased without increasing the read head length, simply by increasing the number of digits in, and/or the base of, the code word.

A second embodiment of the non-binary code track scale includes a code-track-type scale having a pseudo-random sequence of non-binary code words. The non-binary code digits can be grouped into non-binary code words. Each non-binary code word defines a certain absolute position along the measuring axis. The coarse absolute position is determined by inputting a sampled non-binary code word as an address to a lookup table.

These and other features and advantages of this invention are described in or apparent from the following detailed description of the preferred embodiments.

BRIEF DESCRIPTION OF THE DRAWINGS

The preferred embodiments of this invention will be described in detail, with reference to the following figures, wherein:

FIG. 3 is a table showing the correlation between the voltage signal output and non-binary logic level of the code track transducer of FIG. 2;

FIG. 5 is a table showing the correlation between the voltage signal output and non-binary logic level of the code track transducer of FIG. 4;

FIG. 6 is a plan view of a third exemplary embodiment of a code track transducer having a non-binary code-track-type scale and a first exemplary embodiment of a read head usable with the first–third exemplary embodiments of the code track transducer according to this invention;

FIG. 7 is a plan view of a third exemplary embodiment of the code track transducer and a second exemplary embodiment of the read head usable with the first–third exemplary embodiments of the code track transducer according to this invention;

FIG. 8 is a plan view of a third exemplary embodiment of the code track transducer and a third exemplary embodiment of the read head usable with the first–third exemplary embodiments of the code track transducer according to this invention;

FIGS. 9(a)–(y) are graphs of output signals versus position for a base-5 code track scale;

FIG. 11 is a diagram showing a first exemplary embodiment of a non-binary code word pattern according to this invention;

FIG. 12 is a diagram showing a second exemplary embodiment of a non-binary code word pattern according to this invention;

FIG. 13 is a lookup table corresponding to the two digit base-3 non-binary code word pattern of FIG. 4.

DETAILED DESCRIPTION OF THE PREFERRED EMBODIMENTS

Although the structures and methods of this invention are readily applicable to optical, magnetic, capacitive, or inductive scales in both linear and rotary metrology, the following description and examples are directed to linear scales using inductive technology. One of ordinary skill in the art will readily appreciate how to apply the structures and methods disclosed herein to optical, magnetic and capacitive transducers. Thus, while the applicants intend for the scope of this application to cover such embodiments, to avoid unnecessary duplication, only inductive transducers will be used to describe this invention. That is, one of ordinary skill in this art would able to apply the techniques and methods described herein to optical, magnetic and capacitive transducers in a predictable manner. One of ordinary skill in this art would also be able to apply these teachings to optical, magnetic and capacitive transducers without undue experimentation. Thus, a detailed explanation of how the techniques and methods described herein can be applied to optical, magnetic and capacitive transducers is not necessary for an understanding of how the techniques and methods described herein can be applied to optical, magnetic and capacitive transducers and thus is omitted.

Figure 1:
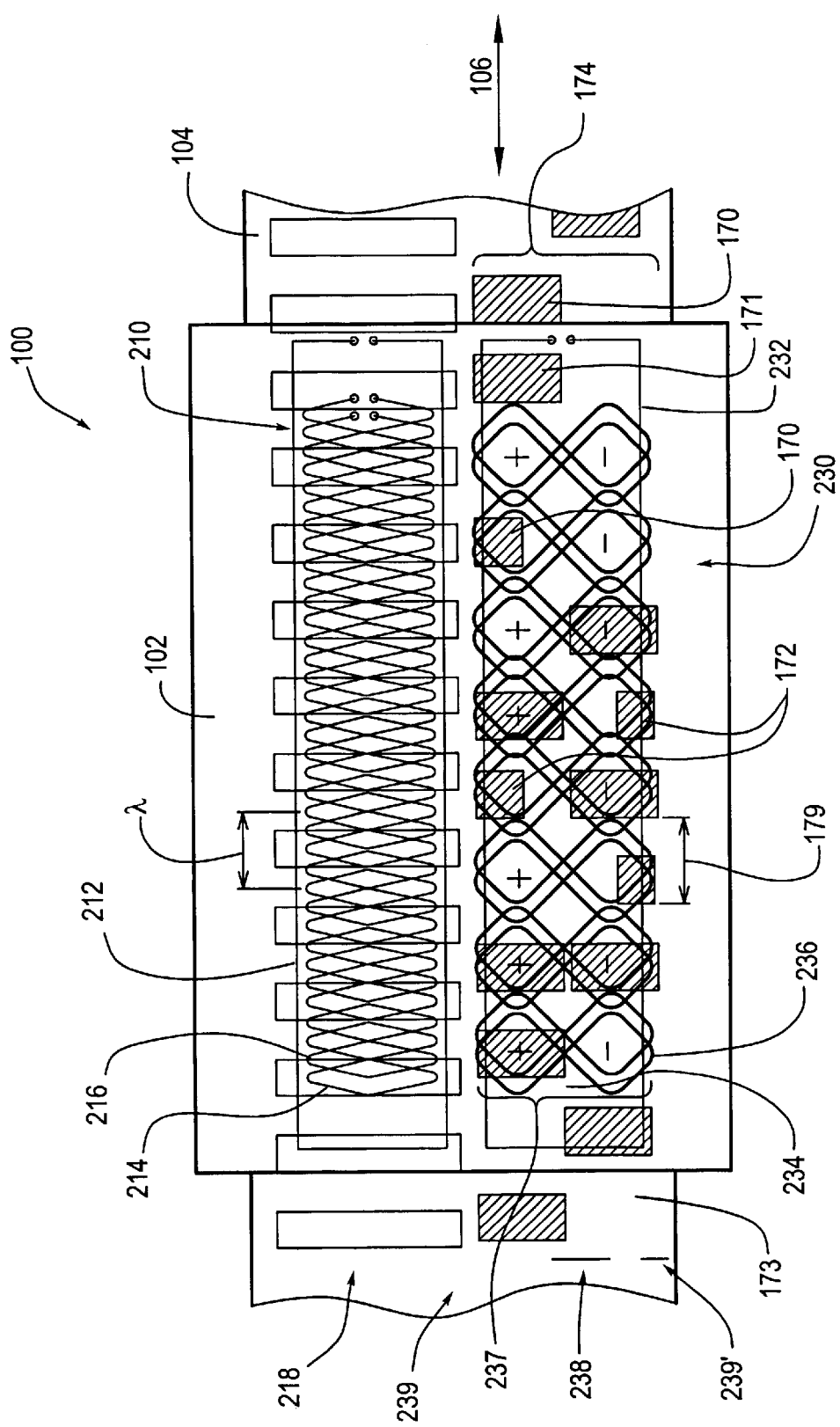
FIG. 1 is a plan view of one exemplary embodiment of an absolute position transducer having a non-binary code-track-type scale according to this invention.

FIG. 1 shows one embodiment of a compact, long-range absolute position inductive transducer according to this invention. The general structure of the inductive transducer shown in FIG. 1, a detailed explanation of the inductive coupling between the read head and scale elements of the inductive transducer shown in FIG. 1, and a detailed description of the general operation of the inductive transducer shown in FIG. 1 are set forth in the incorporated 469 application and the 274 patent, as well as in copending U.S. patent application Ser. No. 08/912,567, filed Aug. 29, 1997, U.S. Pat. No. 6,011,389 herein incorporated by reference in its entirety. Because each of these incorporated references fully describe the general structure and operation of the inductive transducer shown in FIG. 1, the following detailed description of the compact, long-range absolute position transducer according to this invention omits such a description of the generalized structure and operation of the inductive transducer shown in FIG. 1.

FIG. 1 shows one preferred embodiment of the compact, long-range absolute position transducer according to this invention. For a given measurement resolution, the compact, long-range absolute position transducer of this invention can economically provide a much longer absolute position measurement range than that generally permitted by the conventional absolute position inductive transducers, such as those disclosed in the incorporated 469 application and the 274 patent.

As shown in FIG. 1, the compact, long-range absolute position inductive transducer 100 includes a read head 102 and a scale member 104. The read head 102 is movable along the scale 104 in an overlap relationship along a measuring axis 106. The compact, long-range absolute position inductive transducer 100 also includes a fine wavelength incremental inductive transducer 210 having a fine wavelength scale 218 and a code track transducer 230 having a code track scale 238. The fine wavelength transducer 210 and the code track transducer 230 extend along the measuring axis 106. The fine wavelength transducer 210 has a fine wavelength $\lambda$.

The code track transducer 230 is used for two purposes: 1) to generate an analog coarse wavelength by computing the phase difference between the phase angles of the fine wavelength transducer 210 and a fine wavelength output of the code track transducer 230, and 2) to generate a non-binary code, such as one of the codes described below with respect to FIGS. 3 and 4.

As shown in FIG. 1, the fine wavelength transducer 210 includes a first receiver winding 214 and a second receiver winding 216 positioned on the read head 102 and arranged in quadrature, i.e., offset from each other by ¼ wavelength, or 90°, along the measuring axis 106. Each of the receiver windings 214 and 216 includes an equal number of positive and negative loop portions.

Likewise, the non-binary code track transducer 230 includes two sets of windings in quadrature, each set of windings containing eight balanced pairs 237 positioned on the read head 102 and extending along the measuring axis 106. As shown in FIG. 1, each of the balanced pairs 237 of the code track transducer 230 includes a positive loop portion 234 and a negative loop portion 236 aligned perpendicular to the measuring axis 106. The plurality of balanced pairs 237 are surrounded by a transmitter winding 232, while the transmitter winding 212 surrounds only the receiver windings 214 and 216 of the fine wavelength transducer 210.

The phase angle of the read head relative to the fine wavelength is measured by well-known means, as described in the incorporated 469 and 790 applications and the 274 patent. For example, the two receiver windings 214, 216 for the fine wavelength scale 218 are spaced apart such that they produce signals in quadrature. In addition, two or more sensors are used for the code track 238 to allow similar measurement of the phase angle of the read head pattern relative to the code track 238. Although any displacement of these sensor patterns other that 0° or integer multiples of 180° can be used, the windings are preferably spaced at 180°/N, where N is the number of windings. The preferred spacing is 90° for two sensors (producing signals in quadrature), 60° for three sensors, etc. For signals in quadrature, the phase angle is equal to the arctangent of the sine/cosine signals for each scale. Similar equations can be derived for the other spacings of the read head windings and/or for more than two windings.

The code scale 238 shown in FIG. 1 is a non-binary code scale having scale elements 174 comprising two parallel portions formed on the scale member 104. The non-binary code scale 238 includes an upper portion 239 and a lower portion 239'. The two portions are arranged along the measuring axis 106. The upper and lower portions 239 and 239' each include a plurality of the scale elements 174, including a plurality of flux modulators 170 and a plurality of spaces 173.

The flux modulators 170 can be either flux disrupters, flux enhancers or a combination of flux disrupters and flux enhancers, as described in the incorporated 469 application and the 274 patent. Each of the scale elements 174 has a length along the measuring axis 106 equal to one-half of the edge-to-edge distance 179. Each set of scale elements 174 defines one of a series of unique multi-digit non-binary code words. This series of unique multi-bit non-binary code words is preferably sequential. The number of non-binary code words will depend on the number of digits in the non-binary code words and the design rules for the code words.

When both the first polarity loop 234 and the second polarity loop 236 of a balanced loop pair 237 are positioned above a pair of spaces 173, a pair of full-sized flux modulators 171 or a pair of equally-sized, reduced-size flux modulators 170, such as a pair of the half-sized flux modulators 172, the induced electromagnetic flux (EMF) in each of the first and second polarity loops 234 and 236 is nominally the same. Thus, the net voltage amplitude of the signal output from such a balanced loop pair 237 is nominally zero. This holds true for any symmetrical arrangement of a balanced loop pair 237 with respect to the flux modulators 170 or spaces 173.

In contrast, assuming the flux modulators 170 are disrupter-type elements, the first polarity loops 234 are positive polarity loops, and the second polarity loops 236 are negative polarity loops, when a positive polarity loop 234 is positioned over a space 173 of a balanced loop pair 237 and the negative polarity loop 236 of that balanced loop pair 237 is positioned over a full-sized flux disrupter 171 or a half-sized flux disrupter 172, that balanced loop pair 237 outputs a positive amplitude voltage signal. That is, the EMF induced in the positive loop 234 is not disrupted. However, the EMF induced in the negative polarity loop 236 is disrupted. Thus, a net positive EMF is induced in the balanced loop pair 237. The balanced loop pair 237 thus outputs a positive amplitude voltage signal.

Furthermore, if the positive polarity loop 234 of a balanced loop pair 237 is positioned over a full-sized flux disrupter 171 or a half-sized flux disrupter 172, while the negative polarity loop 236 of the balanced loop pair 237 is positioned over a space 173, the balanced loop pair 237 outputs a net negative amplitude voltage signal. That is, the EMF induced in the negative polarity loop 236 would not be disrupted, while the EMF induced in the positive polarity loop 234 would be disrupted. Thus, a net negative EMF is induced in the balanced loop pair 237. The balanced loop pair 237 thus outputs a negative voltage amplitude signal.

It should be appreciated that, if the flux modulators 170 are enhancer-type elements instead of flux disrupters, or the polarities of the first polarity loops 234 and the second polarity loops 236 are reversed, the voltage amplitudes are also reversed. Of course, if both of these changes were made at the same time, the relative voltage amplitudes would remain the same.

Thus, when a space 173 is adjacent to a full-sized flux modulator 171 or a half-sized flux modulator 172, the output from the balanced loop pair 237 lying above that pair of a space 173 and an adjacent full-sized flux modulator 171 or half-sized flux modulator 172 is either a positive voltage or a negative voltage. Further, if there are no full-sized or half-sized flux modulators 171 and/or 172 present to modulate the magnetic flux generated by the transmitter winding 232, each of the balanced loop pairs 237 nominally produces no output signal or a net zero amplitude voltage.

Figure 2:
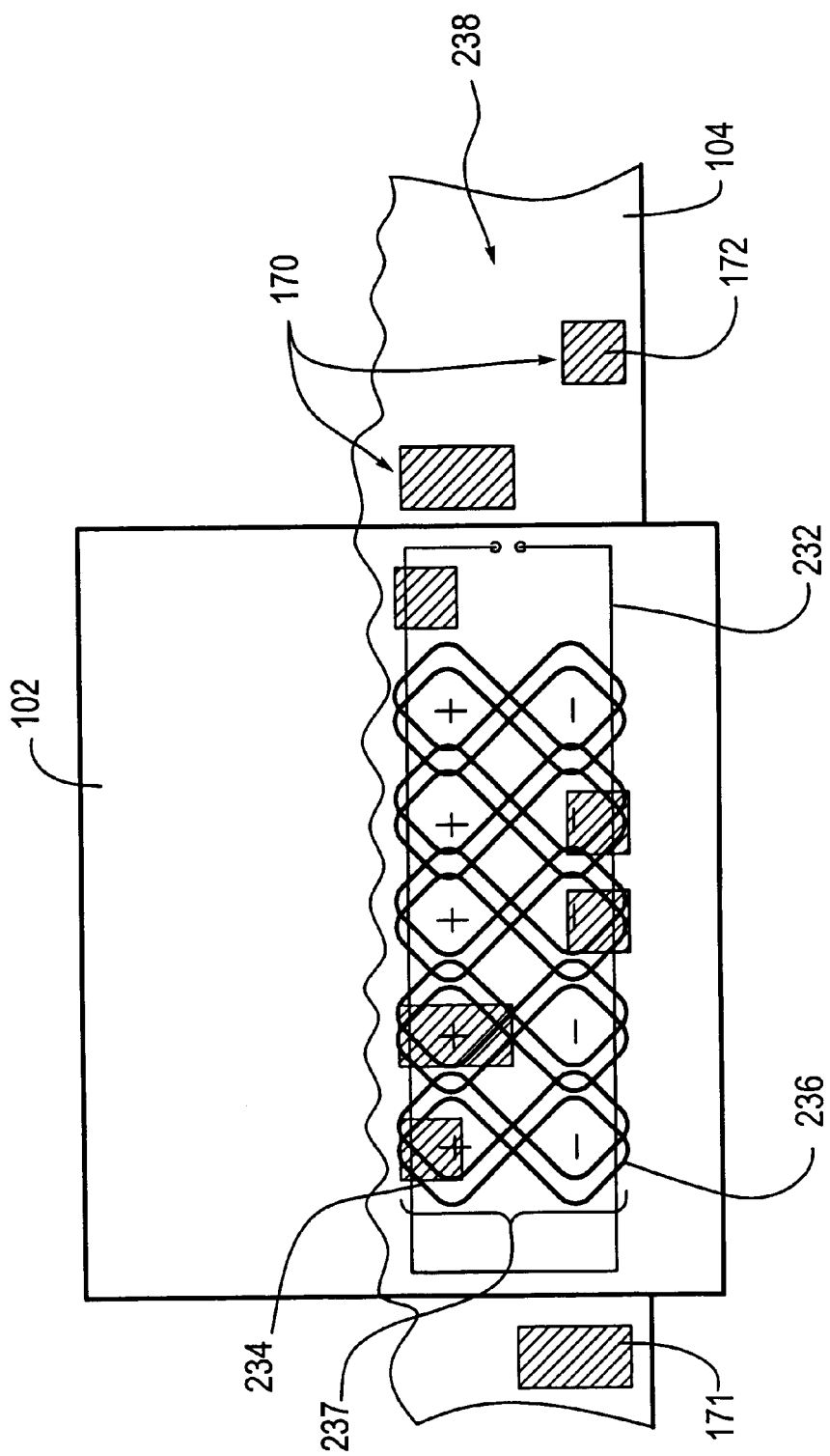
FIG. 2 is a plan view of a first exemplary embodiment of a code track transducer having a non-binary code-track-type scale according to this invention.

FIG. 2 shows one exemplary embodiment for a code track scale 238 where flux enhancers 170 are used as the flux modulators 170. Two different-sized flux enhancers 170 are utilized, the full-sized flux enhancers 171 and the half-sized flux enhancers 172. Thus, a different net output voltage correlates with each different-sized flux enhancer 170. During operation, the positive polarity loops 234 overlying the flux enhancers 170 output a positive voltage, and the negative polarity loops 236 overlying the flux enhancers output a negative voltage. Then, each of the different net output voltages is associated with a different logic level. The correlation between the net output voltage signals and logic levels is shown in FIG. 3. The code track scale shown in FIG. 2 outputs a base-5 code word pattern, a portion of which is shown in FIG. 11. The flux enhancers 170 underlying the balanced loop pairs 237 shown in FIG. 2 correspond to the read head outputs discussed with respect to FIG. 11.

Figure 4:
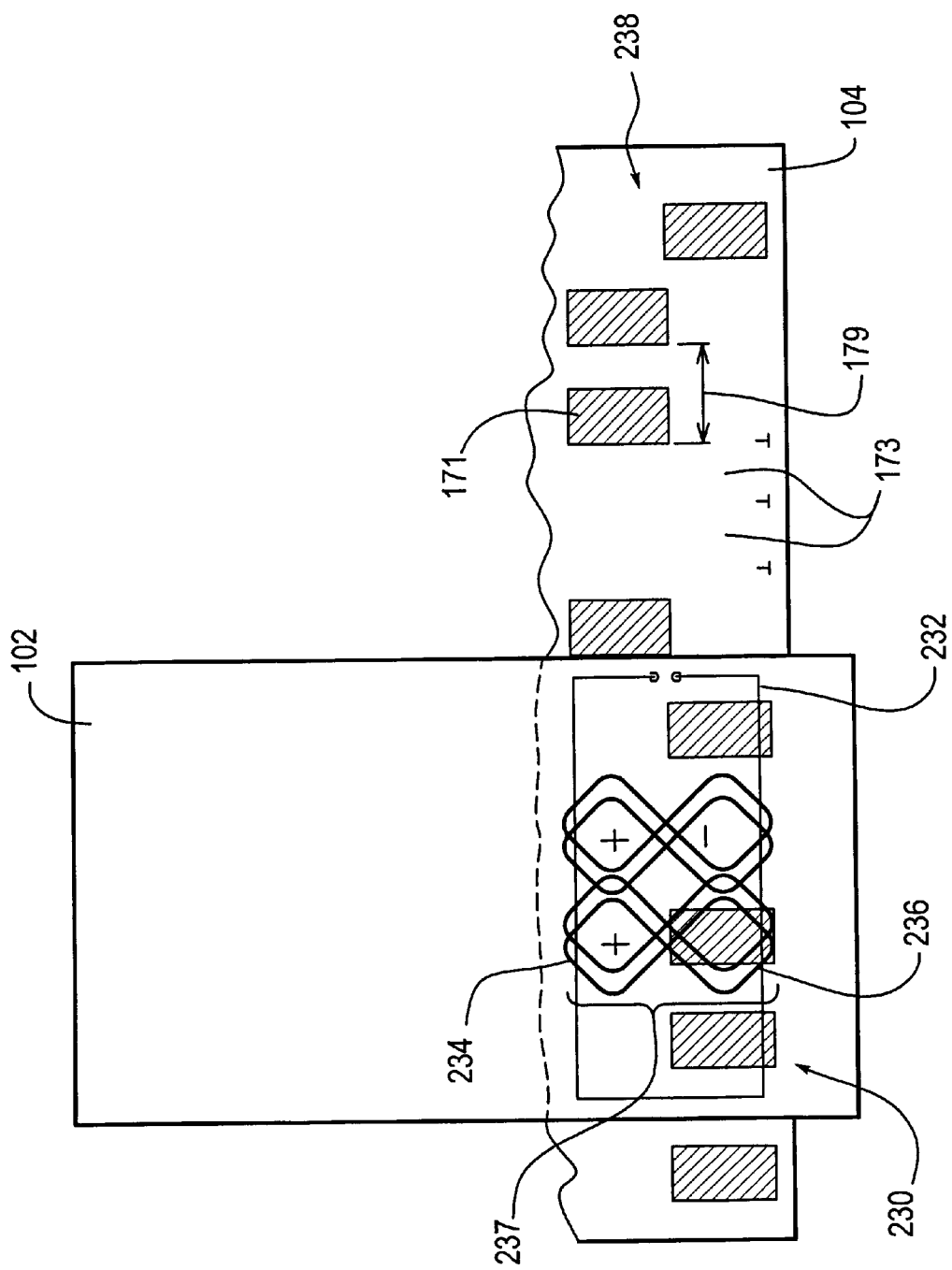
FIG. 4 is a plan view of a second exemplary embodiment of a code track transducer having a non-binary code-track-type scale according to this invention.

FIG. 4 illustrates a second exemplary embodiment for the code track scale 238, where a combination of the spaces 173 and the full-sized flux enhancers 171 are used to generate the base-3 code word pattern shown in FIG. 12. The correlation between the output voltage signals and logic levels is shown in FIG. 5.

It can be appreciated that the flux modulators 170 may be selected from a set of more than two sizes, as long as the output voltage of each size flux modulator is detectable to a satisfactory level of certainty. In another exemplary embodiment, both flux enhancers and flux disrupters, of equal or varied sizes, could be employed to provide an even greater number of logic levels, or to merely double the signal strength for the output voltage associated with each logic level, without increasing the number of logic levels. For example, in the flux disrupter embodiment disclosed above with respect to FIG. 1, the spaces 173 could be replaced with flux enhancers to increase the signal strength.

Furthermore, the phase angle of the read head 102 relative to the coarse wavelength is measured by well-known devices and methods, as described in the incorporated references.

It should be appreciated that the absolute position transducer 100 could be designed using three tracks, two fine wavelength scales and a code track scale with a series of sequential discrete code words. Two windings for each fine wavelength scale are spaced apart such that they produce signals in quadrature (sine and cosine). The phase angle is equal to the arctangent of the sine/cosine signals for each scale. Similar equations can be derived for other spacing of the read head windings, or for more than two windings. The windings are preferably spaced at 180°/N, where N is the number of windings. The two fine wavelength scales could be used to generate a coarse wavelength because the two fine wavelength scales would have different repeat lengths such that the same pair of phase angles occurs on both fine scales only once per coarse wavelength. The length of each code word generated by the code track scale would be equal to the coarse wavelength.

The circuitry and the signal processing steps associated with the fine wavelength transducers and code transducer are essentially the same as those disclosed in the incorporated 469 application and the 274 patent.

FIGS. 6–8 illustrate a third exemplary embodiment for the code track scale 238 where a combination of uniformly-sized flux modulators 170 are used to generate a base-5 code word pattern. The flux modulators 170 are staggered across the width of the code track scale 238. The correlation between the output voltage signals and logic levels is reflected by FIG. 3. FIGS. 6–8 each also show a different embodiment of the spacing of the balanced loop pairs 237.

In the three exemplary embodiments of the read head shown in FIGS. 6–8, the spacing of the balanced loop pairs allows ambiguities in the signal levels to be resolved when the read head 102 is not exactly aligned with the code track elements 174. This third exemplary embodiment of the code track transducer uses redundant balanced loop pairs 237 at evenly spaced intervals. In the first exemplary embodiment of the read head 102 shown in FIG. 6, the balanced loop pairs 237 are spaced at 180° intervals, i.e., two per code track element. The sensor array in FIG. 6 includes 2N+1 balanced loop pairs, where N is the number of code track elements per code word. The "extra" balanced loop pair insures that each code track element 174 will have at least two balanced loop pairs over each code track element. In the second exemplary embodiment of the read head 102 shown in FIG. 7, the balanced loop pairs are spaced at 120°, i.e., three per code track element, and there are 3N+1 balanced loop pairs. In the third exemplary embodiment of the read head 102 shown in FIG. 8, the balanced loop pairs are spaced at 90°, i.e., four per code track element, and there are 4N+1 balanced loop pairs.

In these first-third embodiments of the read head 102 shown in FIGS. 6–8, only every $n^{th}$ balanced loop pair will be used to sense one of the code track elements. In particular, only the n balanced loop pairs that most closely align with the code track elements will be used. Thus, for each of the n sets of n adjacent balanced loop pairs, one of the n adjacent balanced loop pairs will most closely align with an underlying code track element. Because the spacing of the code track elements and the balanced loop pairs is constant, the same relative balanced loop pairs in each set will be the one that most closely aligns with the code track elements.

When the array of balanced loop pairs is read, the output of the set of balanced loop pairs having the largest difference between the maximum and minimum voltages of the balanced loop pairs within the set (also referred to as the "greatest contrasting set") is selected to determine the position of the read head 102 relative to the code track scale 238. Because the sets of balanced loop pairs that are least aligned with the underlying code elements will tend to generate outputs that are functions of the values of two adjacent code elements, those outputs will tend to be in between the discrete values of those two adjacent code elements. That is, in general, the output of any misaligned balanced loop pair will be an average of the sensed adjacent code element values. In contrast, the set of balanced loop pairs that are most closely aligned with the underlying elements will be least affected by adjacent code elements, and thus, will output values that are closer to the discrete values of the underlying code elements.

Alternatively, in yet another exemplary embodiment of the read head 102, an analog fine scale measurement can be used to determine the position of the read head 102 relative to the code track scale 238, and thus, which ones of the balanced loop pairs should be selected. FIGS. 9(*a*)–(*y*) illustrate all possible position-dependent intermediate voltage values between the voltage values for any two adjacent digits for a base-5 code. These intermediate values are stored in a read-only memory (ROM) on the read head 102.

For example, FIG. 9(*e*) shows the position-dependent intermediate voltage value output by a balanced loop pair as the read head is moved such that that balanced loop pair goes from being aligned with a "0" code element to aligned with an adjacent "4" code element. The intersection of the vertical and horizontal axes represent the output signal when a sensor is aligned with the "0" code element. The output signal at the fourth tick mark on the horizontal axis reflects the signal when the sensor is aligned with the adjacent "4" code element. The intermediate tick marks on the horizontal axis represent quarter wavelength positions of that balanced loop pair relative to the two adjacent code elements.

Using an analog fine scale 218, the position of the read head 102 relative to the scale 104 within the wavelength $\lambda$ can be determined. From this incremental relative position, the position of one of the balanced loop pairs relative to adjacent code elements can be determined, and thus, the position of the balanced loop pairs along the horizontal axis of the graphs. The output of each sensor 237 is then compared with the stored graphs to determine which of the graphs has the same output signal for the determined position along the horizontal axis. If there is only one graph that includes the sensor output for the determined position, the code elements to the right and left of the sensor are easily determined. If there are a plurality of graphs that include the same sensor output for the determined position, the determination of the values of the code elements will depend on the determination of the values of other code elements. The use of at least 2N+1 sensors per code element is recommended, so that each code element below the read head will always have at least two sensors, with one of the sensors providing an output that is more closely associated with the code element.

Figure 10:
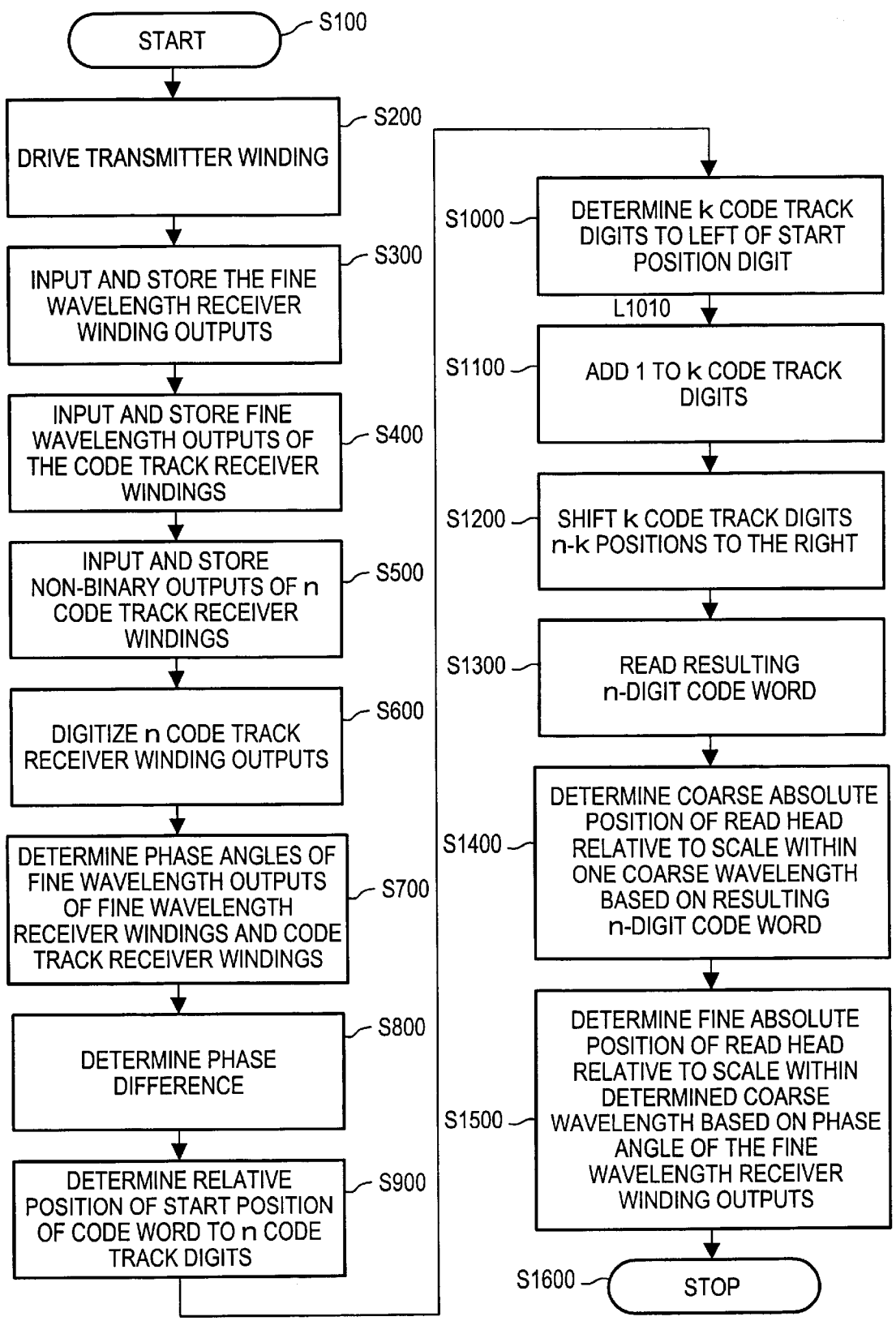
FIG. 10 is a flowchart outlining one exemplary embodiment of a method of determining the absolute position of the read head of the transducer of a non-binary code-track-type scale according to this invention.

FIG. 10 outlines one exemplary embodiment of a method for determining the absolute position of the read head of the absolute position transducer having a non-binary code-track-type scale of this invention. Beginning in step S100, control continues to step S200, where the transmitter winding is driven. Then, in step S300, the outputs of the fine wavelength receiver windings are input and stored. Next, in step S400, the fine wavelength outputs of the code track receiver windings are input and stored. Control then continues to step S500.

In step S500, the non-binary outputs of n code track receiver windings are input and stored. The variable "n" represents the number of digits in a code word. Then, in step S600, the "n" outputs of the code track receiver windings are digitized. Next, in step S700, the phase angles of the fine wavelength receiver windings and fine wavelength outputs of the code track receiver windings are determined. Control then continues to step S800.

In step S800, the phase difference between the fine wavelength receiver windings and fine wavelength outputs of the code track receiver windings is determined. Next, in step S900, the relative position of the start position of a code word to the n code track digits is determined based on the determined phase difference. Then, in step S1000, the number k of code track digits to the left of the start position digit is determined. Control then continues to step S1100.

In step S1100, the non-binary sequence of k code track digits is incremented by one. Then, in step S1200, the rightmost k digits of the incremented non-binary sequence are shifted n-k positions to the right. Next, in step S1300, the resulting n-digit code word is read. Control then continues to step S1400.

In step S1400, the coarse absolute position of the read head relative to the scale is determined within one coarse wavelength, based on the resulting n-digit code word. Next, in step S1500, the fine absolute position of the read head relative to the scale is determined within the determined coarse wavelength based on the phase angle of the fine wavelength receiver winding outputs. Then, in step 1600, the absolute position measuring process stops.

The code track 238 can be arranged in various configurations, depending on the desired scale length and accuracy. FIG. 11 shows a first exemplary embodiment of the arrangement of the code word pattern of the absolute position transducer having a non-binary code-track-type scale of the invention, resulting from the code track scale shown in FIG. 2. FIG. 11 shows only a portion of the sequence of code words. In FIG. 11, the start of each code word is shown by a period (.). Base-5 values are assigned to each digit position, and the digit positions underlying the receiver windings of the code track read head shown in FIG. 2 are enclosed in brackets ([ ]). Ellipses ( . . . ) are used to indicate the continuation of the sequential series.

In FIG. 11, five-digit base-5 code track words increment sequentially from "$00000_5$" through all 3125 steps to "$44444_5$" from left to right. In this embodiment, the most significant digit is on the left and the least significant digit is on the right. Additionally, in FIG. 11, the width of each "digit position" of the code track transducer along the measuring axis is equal to either one-half of, or one whole, wavelength of one of the fine wavelength transducers, depending on the structure of the transducer, and the width of the five digit positions that form a unique code word is equal to the coarse wavelength. A "digit position" is the position on the code track scale that is defined to correspond to the position of the receiver winding given by a balanced loop pair based on the flux modulator or space occupying that digit position, and thus to the digitized output of one of the receiver windings of the code track read head. Because the position corresponding to each digit position on the read head are known, the position of the read head relative to the digit position, and thus to the scale, can be determined.

The sequence of digitized outputs of the receiver windings of the code track read head shown in FIG. 11 is "34112". Although the read head is not aligned with the start position of a code word, the start position for this code word is easy to find, as described in the incorporated '790 application. Once the start position is found, the sequence "3411" of digitized outputs from the receiver windings of the code track read head occurring to the left of the start position is determined and the resulting non-binary number "3411" is incremented by one to obtain a new non-binary number "3412". In the event that the incrementing results in a new non-binary number containing more digits than the previous non-binary number, the most significant digit of the new non-binary number is truncated. Then, this resulting sequence of digits is combined with the original sequence "2" of digitized outputs of the receiver windings of the code track read head occurring to the right of the start position. In particular, the resulting sequence is combined with the original sequence so that the resulting sequence is positioned to the right of the original sequence to determine the code word input by the code track receiver windings. The determined code word "23412" indicates the coarse absolute position of the read head. That is, each code word, whether it appears once per coarse wavelength, or multiple times per coarse wavelength, uniquely identifies a particular coarse wavelength.

Additionally, when each code word appears once per coarse wavelength, the position of the code track read head relative to the start position of the code word also indicates which fine wavelength corresponds to the present position of the read head. That is, in this case, the relative position of the start position within the sensed non-binary sequence indicates the absolute position of the read head to the scale to within a fine wavelength. Then, by reading the output of the fine wavelength receiver windings, the position within the identified fine wavelength can be determined to a high resolution and a fine absolute position determined.

If the code track read head was aligned with any of the next three digit positions of the code scale which are not aligned with the code word, to generate the three non-binary sequences "411.23", "11.234" and "1.2341", the same code word "23412" would still be determined using this procedure. The next position of the read head relative to the code scale, "0.23412", needs no correction, since it is aligned with the start position.

From this example, it is clear that each of the 3125 unique code words can be reconstructed from any position of the read head relative to the code scale, as long as at least five digits can be read and the start position determined. It should also be understood that this method applies to more or fewer than five digits. Alternatively, the word at the left end of the read head can be reconstructed by subtracting one from the previously-determined digit sequences. It should be appreciated that other algorithms can also be used. The most significant digit could be at the right end of the word and the least significant digit at the left, as long as incrementing is replaced with decrementing and left shifting is replaced with right shifting.

It should be appreciated that the non-binary code track of this invention can be arranged so that the code track synchronizes with the phase of the coarse wavelength scale only every P code word lengths, where P is an integer greater than one. In this case, each code word is repeated identically P times as a code block within each coarse wavelength before the code word is incremented, and repeated for the next P code words of the code block for the subsequent coarse wavelength. Accordingly, the digit positions to the left of the start position of the code word only need to be incremented, or decremented, before being shifted to the appropriate end of the code word, when the start position of the code word is also the start position of the code block.

It should also be appreciated that if there are two fine wavelength scales and transducers, the phase difference between the transducers can be used to determine the position of the start position within the sensed non-binary sequence, and can also be used to determine which fine wavelength of the identified coarse wavelength corresponds to the present position of the read head. When there are multiple instances of a code word within a coarse wavelength, this information can be used to resolve any potential ambiguities in the absolute position.

It should also be appreciated that the non-binary code track of this invention can include a second code track to double the number of code digits and square the maximum scale length in code digits. Adding a third code track would cube the maximum scale length in code digits while still maintaining a compact read head. Thus, absolute transducers hundreds of kilometers in length with micrometer resolution are possible.

FIG. 12 shows a second preferred embodiment of the arrangement of the code word pattern of the absolute position transducer having a non-binary code-track-type scale of the invention, resulting in this case from the code track scale 238 shown in FIG. 4. Rather than a sequential non-binary code track scale, as shown in FIG. 11, FIG. 12 shows a pseudo-random non-binary code track scale. The peudo-random code track scale has a two-digit base-3 non-binary code scale pattern. FIG. 13 shows a corresponding lookup table for use with this pattern. A microprocessor (not shown) to which the non-binary code track transducer 230 is coupled determines the coarse absolute position by comparing the sampled non-binary code word to a lookup table. The lookup table is preferably stored in non-volatile memory (not shown). The lookup table relates a given code word to a given coarse absolute position $x_{code}$. The digit pattern shown in FIG. 12 is encoded along the code track to provide the series of "0"s, "1"s, and "2"s for each edge-to-edge distance 179. The absolute measurement range for the two digit base-3 code scale pattern is equal to 9 times the edge-to-edge distance 179. For example, if the fine wavelength λ is equal to 2.56 mm, the absolute range for the non-binary code transducer 230 would be 23.04 mm (9×2.56 mm).

Referring to FIG. 12, if the read head 102 is positioned along the non-binary code scale 238 so that the balanced pairs 237 are positioned and aligned with the code word "01," the microprocessor interprets the non-binary value of the is code word as position 2 from the lookup table of FIG. 13.

If the fine wavelength λ is equal to 2.56 mm, then the coarse absolute position would be approximately 5.12 mm (2×2.56 mm). If the read head 102 is moved two edge-to-edge distances 179 to the right from the position shown in FIGS. 4 and 12, the read head 102 is aligned with the non-binary code word "02." From the lookup table of FIG. 13, the microprocessor interprets the non-binary code word "02" as position 4. Therefore, the new coarse position would be approximately 10.24 mm. It should be appreciated that, based on this detailed description, the lookup table and microprocessor can be configured to convert the non-binary code word to an alternative representation, such as a binary or decimal number, and then associate the alternative representation with a corresponding absolute position of the read head 102.

For applications requiring a longer absolute measurement scale, such as a tape measure, a six-digit code word, base-5 code could be implemented. With an edge-to-edge distance 179 equal to 2.56 mm, the absolute range of a six digit base-5 scale pattern is equal to $5^6 \times 2.56$ mm=40.0 m without repeated codes. In fact, the absolute range of the scale could be increased to 1 km by implementing an eight-digit code word, base-5 code.

It should also be appreciated that the digit pattern can be made circular by joining the two ends of the non-binary code scale. This is one way to form a non-binary code scale for a rotary or cylindrical encoder (not shown). If constructed in this manner, no duplicate code words will be read during one complete sampling of the non-binary code scale. It should be appreciated that, when the ends of the non-binary code scale are connected to form the rotary or cylindrical encoder, the leading "0" and the trailing "0" shown in FIG. 12 will overlap, forming a single set of two consecutive "0"s.

Figure 14:
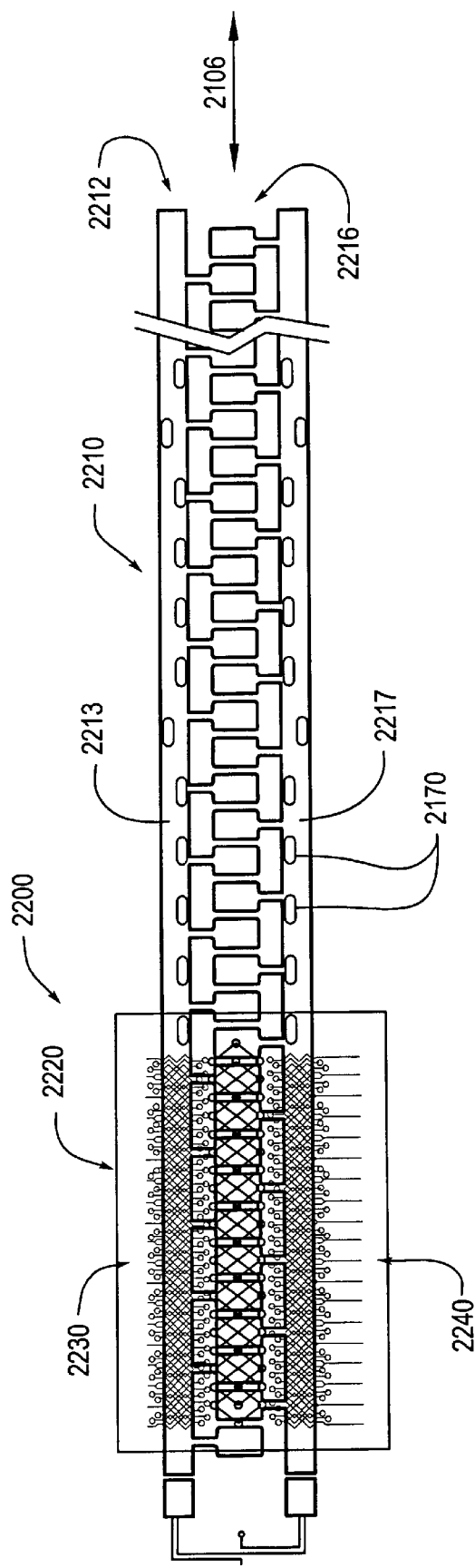
FIG. 14 is a plan view of one exemplary embodiment of a reduced-offset absolute position transducer having a non-binary code-track-type scale according to this invention.

FIG. 14 shows an alternative configuration of absolute position transducer 2200 having a non-binary code-track-type scale. The absolute position transducer 2200 shown in FIG. 14 employs a reduced-offset-type fine wavelength transducer combined with a flux-modulator-type code track transducer. The structure and operation of the reduced-offset transducer is described in greater detail in U.S. patent application Ser. No. 08/834,432, filed Apr. 16, 1997, which is herein incorporated by reference in its entirety. The absolute position transducer 2200 also includes a read head 2220, and the code track transducer includes two code track sensor arrays 2230 and 2240.

As shown in FIG. 14, the reduced-offset scale 2210 includes a first closed-loop coupling loop 2212 interleaved with a second closed-loop coupling loop 2216. Each of the coupling loops 2212 and 2216 is electrically isolated from the other of the coupling loops 2212 and 2216.

The first coupling loop 2212 and second coupling loop 2216 each include a first loop portion 2213 and 2217, respectively. Each of the first loop portions 2213 and 2217 also includes flux modulators 2170 for generating the pattern of non-binary code words of the code track. As discussed above, the code word pattern an be arranged sequentially or in a pseudo-random pattern. The flux modulators 2170 shown in FIG. 14 are illustrated schematically; however, the flux modulators 2170 are structurally and functionally the same as those shown in FIG. 1.

It should be appreciated that the embodiments of the arrangement of the non-binary code track of this invention described above can equally be used in this reduced offset absolute position transducer. Further, the process for determining the absolution position of the read head, described above with respect to FIG. 10, is equally applicable to this reduced offset absolute position transducer.

While this invention has been described above in relation to an inductive transducer, this invention is readily applicable to optical, magnetic, or capacitive transducers in both linear and rotary metrology. Any type of sensor can be substituted for the receiver windings, as long as the flux modulators are replaced by corresponding sensible elements. For example, Hall effect sensors, superconducting quantum interference devices (SQUIDs), magneto resistive (MR) sensors, giant magneto resistive (GMR) sensors, colossal magneto resistive (CMR) sensors, magnetic tunnel junctions, critical currents of a tunnel junction and the like are magnetic sensors that can be substituted for the receiver windings.

While the preferred embodiments of this invention a e generally described as using the inductive transducer of this invention, the transducers can be implemented using any known transducer configuration, such as an optical encoder. With an optical encoder, the flux modulators will instead be reflectors having a reflectance different than that of the spaces between the reflectors.

This invention is described generally herein with respect to a transducer. However it should be appreciated that based on this detailed description, this transducer can be readily adapted to operate as a planar rotary encoder, as set forth in the incorporated 469 application and the 274 patent, or as a cylindrical-rotary or other type of transducer. Additionally, to improve accuracy, or reduce demands on analog signal processing circuits for the receiver output signal, more than two sets of overlapping receiver windings can be used in each transducer. These and other alternatives and details regarding the design and operation of the transducers disclosed herein are similar to those disclosed in the above-identified incorporated references.

In each of the above-described embodiments of the invention, the transmitter winding and the receiver windings of the fine wavelength transducers are preferably manufactured on two layers of a single printed circuit board.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of the invention.

What is claimed is:

1. An absolute position transducer, comprising:
    a scale member;
    a read head member, the read head member and the scale member movable relative to each other along a measuring axis;
    a code track position transducer comprising:
        at least one set of code track sensors formed on the read head member, each set of code track sensors including N sensors, where N is a positive integer greater than 1, and
        a code track formed on the scale member, the code track having a plurality of zones distributed along the measuring axis, at least one sensible element formed in at least some of the plurality of zones; and
    a signal generating and processing circuit electrically connected to each set of code track sensors;
    wherein:
        the sensible elements modulate an output of the N sensors of each set of code track sensors based on a relative position between the read head member and the scale member,
        the sensible elements are distributed on the scale member such that each zone is capable of producing one of a set of M output states in an overlying sensor where M is greater than 2, the zones forming a series of code elements extending along the measuring axis, each consecutive set of n code elements forming a non-binary code word, and
        each non-binary code word defines an absolute position of the read head member relative to the scale member to a first resolution.

2. The absolute position transducer of claim 1, wherein the at least one set of sensors are at least one set of receiver windings, and the sensible elements are flux modulators.

3. The absolute position transducer of claim 2, wherein the code track position transducer includes a code track transmitter winding formed on the read head member.

4. The absolute position transducer of claim 3, wherein:
    the code track transmitter winding and each receiver winding form an inductive coupling; and the flux modulators modulate the inductive coupling between each receiver winding and the code track transmitter winding.

5. The absolute position transducer of claim 2, wherein: the plurality of flux modulators of the code track includes one of a plurality of flux disrupters, a plurality of flux enhancers, and a plurality of flux disrupters and flux enhancers.

6. The absolute position transducer of claim 1, wherein:
the at least one set of code track sensors comprises a first set of code track sensors and a second set of code track sensors; and
the second set of code track sensors is spatially offset from the first set of code track sensors along the measuring axis.

7. The absolute position transducer of claim 1, wherein the absolute position transducer is included in one of a caliper, a linear scale, a micrometer, a rotary encoder, a tape measure and a height gage.

8. The absolute position transducer of claim 1, further comprising at least one fine track transducer, each fine track transducer producing cyclic signals at a distinct spatial frequency and comprising:
at least one fine track sensor formed on the read head member; and
a fine track scale portion formed on the scale member, the scale portion including a plurality of sensible elements spatially distributed on the scale member along the measuring axis at the distinct spatial frequency such that an output of the at least one fine track sensor is based on a relative position between the read head member and the scale member;
wherein the at least one fine track transducer defines a fine absolute position of the read head member relative to the scale member to a second resolution finer than the first resolution defined by the code track position transducer.

9. The absolute position transducer of claim 8, wherein a phase difference between the code track transducer and one of the at least one fine track transducers generates a coarse wavelength.

10. The absolute position transducer of claim 9, wherein each coarse wavelength extends over a number P of the code words, where P is an integer number at least equal to 1.

11. The absolute position transducer of claim 8, wherein the at least one fine track transducer includes two fine track transducers, and
a phase difference between the two fine track transducers generates a coarse wavelength.

12. The absolute position transducer of claim 11, wherein each coarse wavelength extends over a number P of the code words, where P is an integer number at least equal to 1.

13. The absolute position transducer of claim 8, wherein each of the at least one fine track sensors comprises a fine track receiver winding, and the sensible elements are flux modulators.

14. The absolute position transducer of claim 13, wherein each fine track transducer includes a fine track transmitter winding formed on the read head member.

15. The absolute position transducer of claim 14, wherein:
each fine track transmitter winding and each receiver winding, respectively, form an inductive coupling; and
the plurality of flux modulators of the fine track transducers includes one of a plurality of flux disrupters, a plurality of flux enhancers, and a plurality of flux disrupters and flux enhancers.

16. The absolute position transducer of claim 13, wherein the plurality of flux modulators of the fine track scale portion includes one of a plurality of flux disrupters, a plurality of flux enhancers, and a plurality of flux disrupters and flux enhancers.

17. The absolute position transducer of claim 8, wherein:
each at least one fine track sensor comprises a first fine track receiver winding and a second fine track receiver winding; and
the first fine track receiver winding is spatially offset from the second fine track receiver winding along the measuring axis.

18. The absolute position transducer of claim 17, wherein the first fine track receiver winding is spatially offset from the second fine track receiver winding by one-quarter of a wavelength of the at least one fine track receiver winding.

19. The absolute position transducer of claim 14, wherein a single transmitter winding forms both the at least one fine track transmitter winding and a code track transmitter winding.

20. The absolute position transducer of claim 1, wherein each consecutive set of n code elements forms a sequential non-binary code word.

21. The absolute position transducer of claim 1, wherein each consecutive set of n code elements forms a pseudo random non-binary code word.

22. The absolute position transducer of claim 1, wherein the at least one set of code track sensors includes J*n+1 sensors overlying a set of n code elements, where J is the number of sensors per code element.

23. A method for determining an absolute position of a first member relative to a second member in an absolute position transducer, comprising:
inputting a set of j adjacent code element measurements, each code element measurement responsive to at least one of a plurality of code elements positioned on one of the first and second members and extending along a measurement axis;
converting each of the j code element measurements into an output value;
determining a relative position of the j output values to a starting point of a j-digit absolute position non-binary code word;
determining the j-digit absolute position non-binary code word based on the determined relative position of the j output values to the starting point; and
determining a first-resolution absolute position measurement based on the j-digit non-binary code word.

24. The method of claim 23, further comprising:
taking an incremental position measurement between the first and second members at a second resolution; and
determining a second-resolution absolute position measurement between the first and second members from the first-resolution absolute position measurement and the second-resolution incremental position measurement;
wherein the first resolution is coarser than the second resolution.

25. The method of claim 24, wherein taking the second-resolution incremental position measurement comprises:
determining a phase $\phi F$ of the second-resolution incremental position measurement, and
determining the second-resolution incremental position measurement from the phase $\phi F$ and an incremental scale wavelength $\lambda F$.

26. The method of claim 23, wherein determining the relative position of the j output values to the starting point of the j-digit absolute position non-binary code word comprises:

- determining a phase difference between two fine track transducers, the phase difference corresponding to a relative position of the first and second members within a coarse wavelength of the absolute position transducer; and
- determining the relative position of the j output values to the starting point of the absolute position non-binary code word based on the determined phase difference and a predetermined relationship between a relative position of the starting point and a predetermined position within the coarse wavelength.

27. The method of claim 23, wherein determining the relative position of the output values to the starting point of the absolute position non-binary code word comprises:

- determining a phase difference between a fine track transducer and a code track transducer, the phase difference corresponding to a relative position of the first and second members within a coarse wavelength of the absolute position transducer; and
- determining the relative position of the j output values to the starting point of the absolute position non-binary code word based on the determined phase difference and a predetermined relationship between a relative position of the starting point and a predetermined position within the coarse wavelength.

* * * * *